(12) United States Patent
Coria

(10) Patent No.: US 10,195,679 B2
(45) Date of Patent: Feb. 5, 2019

(54) PORTABLE PIPE SAW ASSEMBLY

(71) Applicant: Alfonso Coria, Pasadena, TX (US)

(72) Inventor: Alfonso Coria, Pasadena, TX (US)

( * ) Notice: Subject to any disclaimer, the term of this patent is extended or adjusted under 35 U.S.C. 154(b) by 15 days.

(21) Appl. No.: 15/248,219

(22) Filed: Aug. 26, 2016

(65) Prior Publication Data

US 2018/0056413 A1    Mar. 1, 2018

(51) Int. Cl.
*B23D 53/12* (2006.01)

(52) U.S. Cl.
CPC .................. *B23D 53/12* (2013.01)

(58) Field of Classification Search
CPC ................. B23D 53/12; B23D 55/10
See application file for complete search history.

(56) References Cited

U.S. PATENT DOCUMENTS

| | | | |
|---|---|---|---|
| 1,789,569 A | 1/1931 | Tannewitz | |
| 2,876,809 A * | 3/1959 | Rentsch | B23D 53/12 30/380 |
| 3,704,516 A | 12/1972 | Ono | |
| 3,711,076 A | 1/1973 | Goetz | |
| 3,881,385 A | 5/1975 | Coy | |
| 4,805,500 A | 2/1989 | Saito et al. | |
| D571,175 S | 6/2008 | Wright | |
| 2004/0020061 A1 * | 2/2004 | O'Banion | B23D 53/12 30/380 |
| 2006/0260458 A1 * | 11/2006 | Friend | B23D 53/08 83/788 |
| 2007/0101851 A1 * | 5/2007 | McIntosh | B23D 53/006 83/788 |
| 2008/0115367 A1 * | 5/2008 | Glynn | B23D 53/12 30/122 |
| 2008/0282556 A1 * | 11/2008 | McIntosh | B23D 53/12 30/380 |
| 2011/0197457 A1 * | 8/2011 | Wackwitz | B23D 53/12 30/380 |
| 2013/0112054 A1 | 5/2013 | Chiao | |

* cited by examiner

Primary Examiner — Omar Flores Sanchez

(57) ABSTRACT

A portable pipe saw assembly includes a saw that may be manipulated thereby facilitating the saw to engage a member. The saw has a pair of housings. The housings are spaced apart from each other to define a cutting space. The cutting space receives the member. The cutting space has a width of at least sixteen inches and a depth of at least twenty inches. A cutting unit is movably coupled to the saw. The cutting unit engages the member thereby facilitating the cutting unit to cut the member.

13 Claims, 5 Drawing Sheets

PORTABLE PIPE SAW ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to saw devices and more particularly pertains to a new saw device for cutting a member having a width of thirty six inches.

BRIEF SUMMARY OF THE INVENTION

An embodiment of the disclosure meets the needs presented above by generally comprising a saw that may be manipulated thereby facilitating the saw to engage a member. The saw has a pair of housings. The housings are spaced apart from each other to define a cutting space. The cutting space receives the member. The cutting space has a width of at least sixteen inches and a depth of at least twenty inches. A cutting unit is movably coupled to the saw. The cutting unit engages the member thereby facilitating the cutting unit to cut the member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
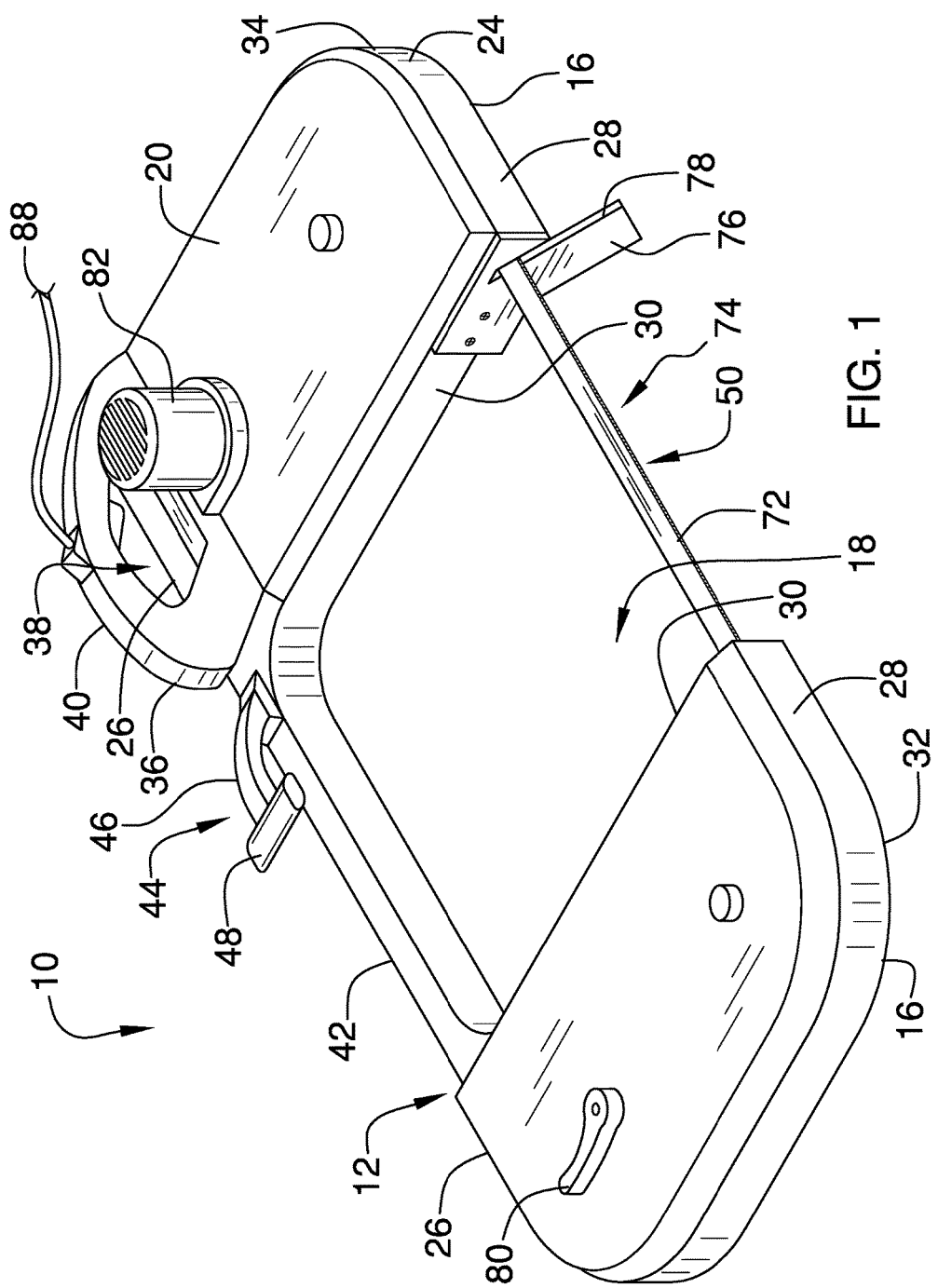
FIG. 1 is a front perspective view of a portable pipe saw assembly according to an embodiment of the disclosure.
Figure 2:
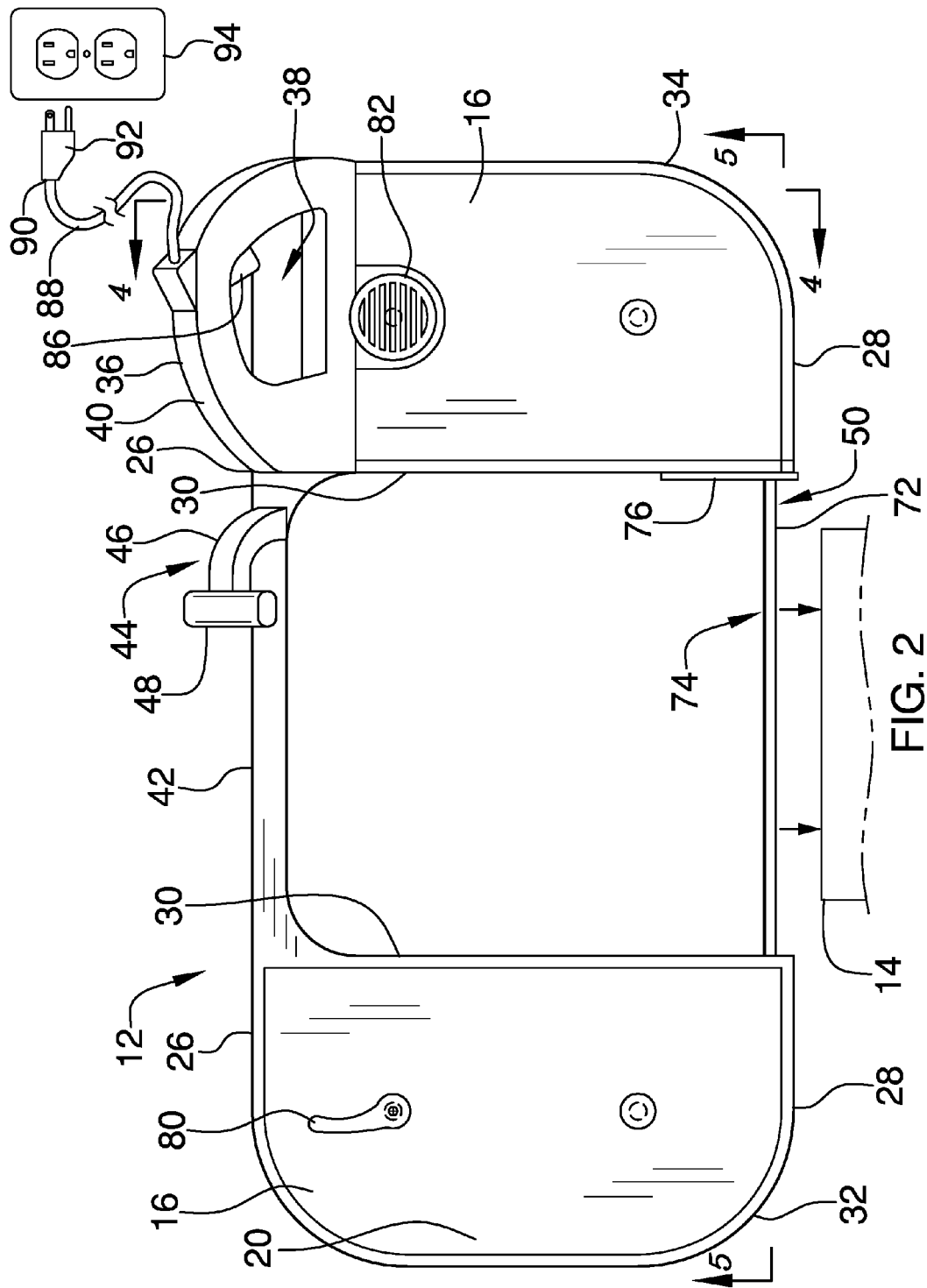
FIG. 2 is a top view of an embodiment of the disclosure.
Figure 3:
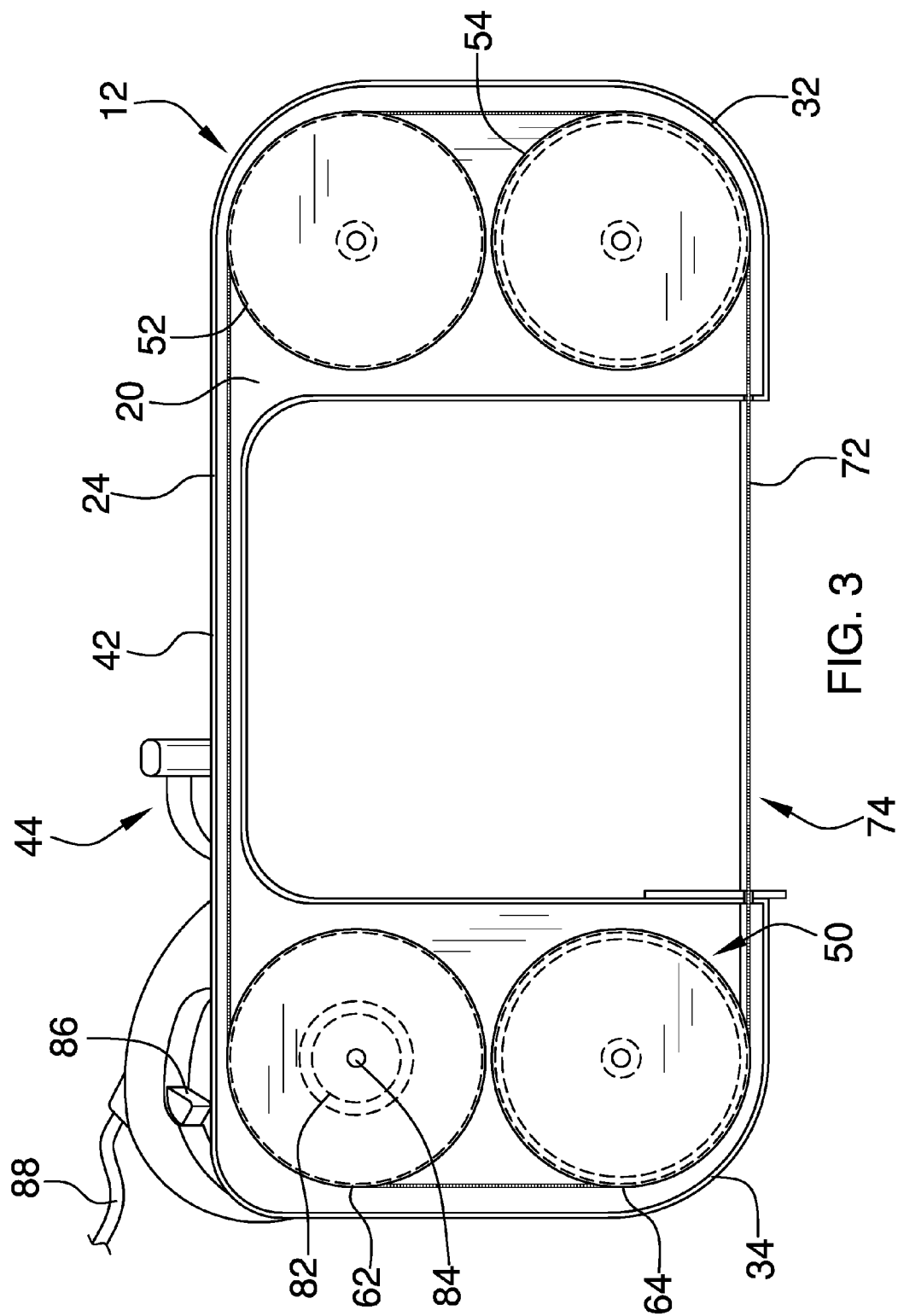
FIG. 3 is a bottom phantom view of an embodiment of the disclosure.
Figure 4:
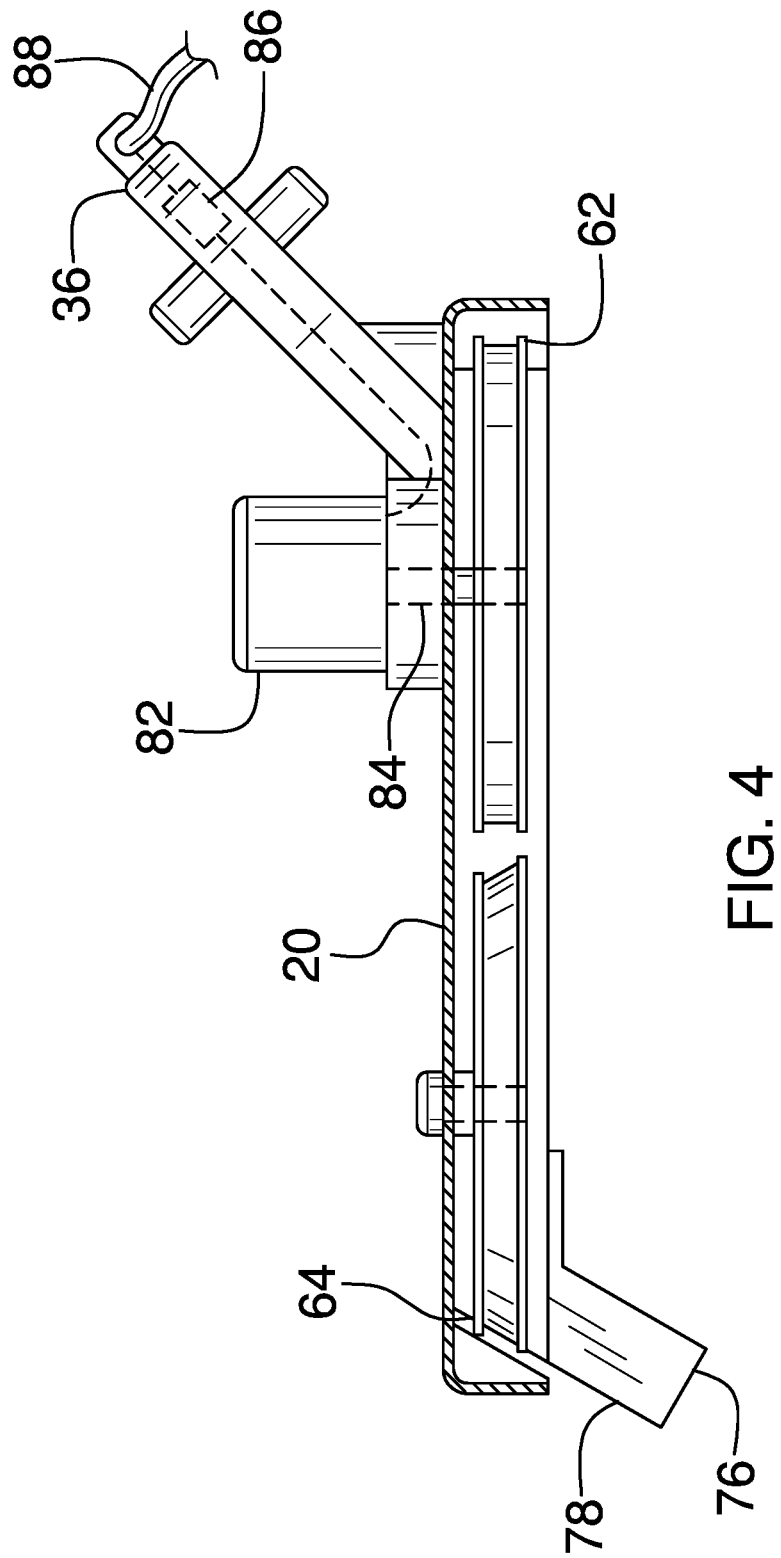
FIG. 4 is a cross sectional view taken along line 4-4 of FIG. 2 of an embodiment of the disclosure.
Figure 5:
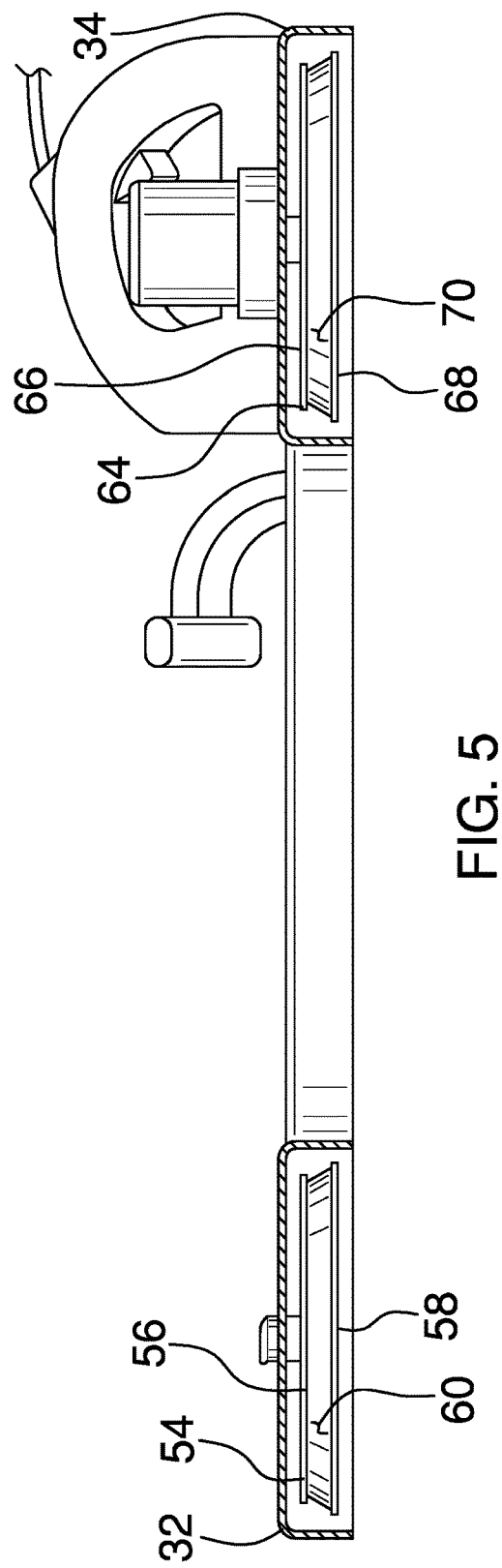
FIG. 5 is a cross sectional view taken along line 5-5 of FIG. 2 of an embodiment of the disclosure.

With reference now to the drawings, and in particular to FIGS. 1 through 5 thereof, a new saw device embodying the principles and concepts of an embodiment of the disclosure and generally designated by the reference numeral 10 will be described.

As best illustrated in FIGS. 1 through 5, the portable pipe saw assembly 10 generally comprises a saw 12 that may be manipulated. The saw 12 may be placed to engage a member 14. The member 14 may be a beam or the like comprised of a metallic material. Moreover, the member 14 may have a maximum outside width of eight one cm.

The saw 12 has a pair of housings 16. The housings 16 are spaced apart from each other to define a cutting space 18. The member 14 may be positioned in the cutting space 18. The cutting space 18 has a width of at least sixteen inches and a depth of at least twenty inches.

Each of the housings 16 has a first wall 20 and a peripheral wall 24 extending downwardly therefrom. The peripheral wall 24 corresponding to each of the housings 16 has a first side 26, a second side 28 and a third side 30 extending between the first side 26 and the second side 28. The pair of housings 16 includes a first housing 32 and a second housing 34. The third side 30 of the first housing 32 is spaced from the third side 30 of the second housing 34 to define the cutting space 18.

The saw 12 comprises a plate 36 that is coupled to and extends upwardly from the first wall 20 of the second housing 34. The plate 36 has an opening 38 extending therethrough to define a first handle 40. The plate 36 is aligned with the first side 26 of the second housing 34. The plate 36 is oriented at an obtuse angle with respect to the first wall 20 of the second housing 34. An arm 42 extends between the first housing 32 and the second housing 34. Thus, the first housing 32 is spaced from the second housing 34. The arm 42 is aligned with the first side 26 corresponding to each of the first housing 32 and the second housing 34.

A second handle 44 is coupled to and extending upwardly from the arm 42. The second handle 44 has a stem 46 and a grip 48. The grip 48 corresponding to the second handle 44 is oriented transverse with respect the stem 46. The stem 46 is coupled to the arm 42 having the grip 48 being spaced from the arm 42. The second handle 44 is positioned closer to the second housing 34 than the first housing 32. The stem 46 curving toward the first housing 32 and the stem 46 is oriented at an obtuse angle with respect to the arm 42. The grip 48 may be gripped to stabilize the saw 12.

A cutting unit 50 is provided. The cutting unit 50 is movably coupled to the saw 12. The cutting unit 50 engages the member 14. Thus, the cutting unit 50 may cut the member 14.

The cutting unit 50 comprises a first pulley 52. The first pulley 52 is rotatably positioned within the first housing 32. The first pulley 52 is positioned closer to the first side 26 of the first housing 32 than the second side 28 of the first housing 32. The first pulley 52 is selectively movable along an axis extending through the first side 26 and the second side 28 of the first housing 32.

A second pulley 54 is rotatably positioned with the first housing 32. The second pulley 54 is positioned closer to the second side 28 of the first housing 32 than the first side 26 of the first housing 32. The second pulley 54 has a top side 56, a bottom side 58 and an engaging surface 60 extending therebetween. The engaging surface 60 angles outwardly between the top side 56 and the bottom side 58. The second pulley 54 is aligned with the first pulley 52.

A third pulley 62 is provided. The third pulley 62 is rotatably positioned within the second housing 34. The third pulley 62 is positioned closer to the first side 26 of the second housing 34 than the second side 28 of the second housing 34. The third pulley 62 is aligned with the first pulley 52.

A fourth pulley 64 is rotatably positioned with the second housing 34. The fourth pulley 64 is positioned closer to the second side 28 of the second housing 34 than the first side 26 of the second housing 34. The fourth pulley 64 has an upper side 66, a lower side 68 and an engaging surface 70 extending therebetween. The engaging surface 70 of the fourth pulley 64 angles outwardly between the upper side 66 and the lower side 68. The fourth pulley 64 is aligned with the third pulley 62 and the second pulley 54. Each of the first pulley 52, the second pulley 54 and the fourth pulley 64 may include a bearing and a shaft 84 or the like.

A blade 72 extends around the first pulley 52, the second pulley 54, the third pulley 62 and the fourth pulley 64. The blade 72 extends through the third side 30 of the first housing 32 and the third side 30 of the first housing 32 to define an exposed portion 74 of the blade 72. The exposed portion 74 of the blade 72 is coextensive with the second side 28 of the first housing 32 and the second housing 34. Thus, the exposed portion 74 of the blade 72 may cut the member 14. The exposed portion 74 of the blade 72 is positioned at an angle corresponding to the engaging surface 60 corresponding to each of the second pulley 54 and the fourth pulley 64. The blade 72 is continuous such that the blade 72 forms a closed loop. Moreover, the blade 72 may comprise a band saw 12 blade 72 or the like.

A rest 76 is coupled to and extends downwardly from the second housing 34. The rest 76 is positioned on the third side 30 of the second housing 34. Moreover, the rest 76 is positioned at an intersection of the third side 30 of the second housing 34 and the second side 28 of the second housing 34. Thus, the rest 76 may abut the member 14 thereby facilitating the rest 76 to retain the member 14 in the cutting space 18. The rest 76 has a first edge 78. The rest 76 is positioned such that the first edge 78 is positioned at an angle corresponding to the exposed portion 74 of the blade 72.

A lever 80 is provided. The lever 80 is movably coupled to the first wall 20 of the first housing 32. Thus, the lever 80 may be manipulated. The lever 80 engages the first pulley 52 such that the lever 80 urges the first pulley 52 along the axis. The lever 80 selectively tightens and loosens the blade 72.

A motor 82 is coupled to the first wall 20 of the second housing 34. The motor 82 is aligned with the third pulley 62. The motor 82 may comprise an electric motor 82 or the like. A shaft 84 is coupled between the motor 82 and the third pulley 62. Thus, the motor 82 rotates the third pulley 62 when the motor 82 is turned on. The third pulley 62 urges the blade 72 to move when the motor 82 is turned on.

A trigger 86 is provided. The trigger 86 is movably coupled to the first handle 40 and the trigger 86 may be manipulated. The trigger 86 is electrically coupled to the motor 82. Thus, the trigger 86 turns the motor 82 on when the trigger 86 is manipulated.

A power cord 88 is coupled to and extends outwardly from the first handle 40. The power cord 88 is electrically coupled to the trigger 86. The power cord 88 has a distal end 90 with respect to the first handle 40. A plug 92 is electrically coupled to the distal end 90. The plug 92 may be electrically coupled to a power source 94. The power source may comprise an electrical outlet or the like.

In use, each of the first handle 40 and the second handle 44 are gripped. The saw 12 is manipulated to position the blade 72 against the member 14. The rest 76 is abutted against the member 14. The trigger 86 is manipulated to turn the motor 82 on and rotate the blade 72. Thus, the blade 72 begins to cut the member 14. The saw 12 is manipulated such that the member 14 moves into the cutting space 18 as the blade 72 cuts the member 14.

The saw 12 cuts entirely through the member 14 when the member 14 has a width of less than forty cm. The saw 12 cuts partially through the member 14 when the member has a width greater than forty cm. The member 14 is flipped over and the saw 12 cuts the rest of the way through the member 12 when the member 12 has a width greater than forty cm. The saw 12 cuts a member 12 having a maximum width of eighty one cm.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable pipe saw assembly being configured to cut a thirty six inch member, said assembly comprising:

a saw being configured to be manipulated thereby facilitating said saw to engage a member, said saw having a pair of housings, said housings being spaced apart from each other to define a cutting space wherein said cutting space is configured to receive the member, said cutting space having a width of at least sixteen inches and a depth of at least twenty inches, each of said housings having a first wall and a peripheral wall extending downwardly therefrom, said peripheral wall corresponding to each of said housings having a first side, a second side and a third side extending between said first side and said second side, said pair of housings including a first housing and a second housing, said third side of said first housing being spaced from said third side of said second housing to define said cutting space, said saw comprising a plate being coupled to and extending upwardly from said first wall of said second housing, said plate having an opening extending therethrough to define a first handle, said plate being aligned with and extending along said first side of said second housing, said plate being oriented at an obtuse angle with respect to said first wall of said second housing, an arm extending between said first housing and said second housing such that said first housing is spaced from said second housing, said arm being aligned with said first side corresponding to each of said first housing and said second housing;

a second handle being coupled to and extending upwardly from said arm, said second handle having a stem and a grip, said grip corresponding to said second handle being oriented transverse with respect said stem, said stem being coupled to said arm having said grip being spaced from said arm, said second handle being positioned closer to said second housing than said first housing, said stem curving toward said first housing such that said grip is positioned closer to said first housing than an opposite end of said stem, said grip being perpendicular to said first handle, said stem being coplanar with said plate; and a cutting unit being movably coupled to said saw, said cutting unit being configured to engage the member thereby facilitating said cutting unit to cut the member.

2. The assembly according to claim 1, wherein said cutting unit comprises a first pulley being rotatably positioned within said first housing, said first pulley being positioned closer to said first side of said first housing than said second side of said first housing, said first pulley being selectively movable along an axis extending through said first side and said second side of said first housing.

3. The assembly according to claim 2, further comprising a second pulley being rotatably positioned with said first housing, said second pulley being positioned closer to second side of said first housing than said first side of said first housing, said second pulley having a top side, a bottom side and an engaging surface extending therebetween, said engaging surface angling outwardly between said top side and said bottom side.

4. The assembly according to claim 3, further comprising a third pulley being rotatably positioned within said second housing, said third pulley being positioned closer to said first side of said second housing than said second side of said second housing.

5. The assembly according to claim 4, further comprising a fourth pulley being rotatably positioned with said second housing, said fourth pulley being positioned closer to said second side of said second housing than said first side of said second housing, said fourth pulley having an upper side, a lower side and an engaging surface extending therebetween, said engaging surface of said fourth pulley angling outwardly between said upper side and said lower side.

6. The assembly according to claim 5, further comprising a blade extending around said first pulley, said second pulley, said third pulley and said fourth pulley, said blade extending through said third side of said first housing and said third side of said first housing to define an exposed portion of said blade, said exposed portion of said blade being coextensive with said second side of said first housing and said second housing wherein said exposed portion of said blade is configured to cut the member, said exposed portion of said blade being positioned at an angle corresponding to said engaging surface corresponding to each of said second pulley and said fourth pulley.

7. The assembly according to claim 1, further comprising:
a blade having an exposed portion; and
a rest being coupled to and extending downwardly from said second housing, said rest being positioned on said third surface of said second housing, said rest being positioned at an intersection of said third surface of said second housing and said second surface of said second housing wherein said rest is configured to abut the member thereby facilitating said rest to retain the member in said cutting space, said rest having a first edge, rest being positioned such that said first edge is positioned at an angle corresponding to said exposed portion of said blade.

8. The assembly according to claim 2, further comprising:
a blade; and
a lever being movably coupled to said first wall of said first housing wherein said lever is configured to be manipulated, said lever engaging said first pulley such that said lever urges said first pulley along said axis, said lever selectively tightening and loosening said blade.

9. The assembly according to claim 3, further comprising:
a third pulley; and
a motor being coupled to said first wall of said second housing, said motor being aligned with said third pulley.

10. The assembly according to claim 9, further comprising a shaft being coupled between said motor and said third pulley such that said motor rotates said third pulley when said motor is turned on, said third pulley urging said blade to move when said motor is turned on.

11. The assembly according to claim 9, further comprising:
a first handle; and
a trigger being coupled to said first handle wherein said trigger is configured to be manipulated, said trigger being electrically coupled to said motor such that said trigger turns said motor on when said trigger is manipulated.

12. The assembly according to claim 11, further comprising a power cord being coupled to and extending outwardly from said first handle, said power cord being electrically coupled to said trigger, said power cord having a distal end with respect to said first handle, said distal end having a plug being electrically coupled thereto, said plug being configured to be electrically coupled to a power source.

13. A portable pipe saw assembly being configured to cut a thirty six inch member, said assembly comprising:
a saw being configured to be manipulated thereby facilitating said saw to engage a member, said saw having a pair of housings, said housings being spaced apart from each other to define a cutting space wherein said cutting space is configured to receive the member, said cutting space having a width of at least sixteen inches and a depth of at least twenty inches, each of said housings having a first wall and a peripheral wall extending downwardly therefrom, said peripheral wall corresponding to each of said housings having a first side, a second side and a third side extending between said first side and said second side, said pair of housings including a first housing and a second housing, said third side of said first housing being spaced from said third side of said second housing to define said cutting space, said saw comprising:
- a plate being coupled to and extending upwardly from said first wall of said second housing, said plate having an opening extending therethrough to define a first handle, said plate being aligned with and extending along said first side of said second housing, said plate being oriented at an obtuse angle with respect to said first wall of said second housing,
- an arm extending between said first housing and said second housing such that said first housing is spaced from said second housing, said arm being aligned with said first side corresponding to each of said first housing and said second housing,
- a second handle being coupled to and extending upwardly from said arm, said second handle having a stem and a grip, said grip corresponding to said second handle being oriented transverse with respect said stem, said stem being coupled to said arm having said grip being spaced from said arm, said second handle being positioned closer to said second housing than said first housing, said stem curving toward said first housing such that said grip is positioned closer to said first housing than an opposite end of said stem, said grip being perpendicular to said first handle, said stem being coplanar with said plate; and
- a cutting unit being movably coupled to said saw, said cutting unit being configured to engage the member thereby facilitating said cutting unit to cut the member, said cutting unit comprising:
  - a first pulley being rotatably positioned within said first housing, said first pulley being positioned closer to said first side of said first housing than said second side of said first housing, said first pulley being selectively movable along an axis extending through said first side and said third side of said first housing,
  - a second pulley being rotatably positioned with said first housing, said second pulley being positioned closer to said second side of said first housing than said first side of said first housing, said second pulley having a top side, a bottom side and an engaging surface extending therebetween, said engaging surface angling outwardly between said top side and said bottom side,
  - a third pulley being rotatably positioned within said second housing, said third pulley being positioned closer to said first side of said second housing than said second side of said second housing,
  - a fourth pulley being rotatably positioned with said second housing, said fourth pulley being positioned closer to said second side of said second housing than said first side of said second housing, said fourth pulley having an upper side, a lower side and an engaging surface extending therebetween, said engaging surface of said fourth pulley angling outwardly between said upper side and said lower side,
  - a blade extending around said first pulley, said second pulley, said third pulley and said fourth pulley, said blade extending through said third side of said first housing and said third side of said first housing to define an exposed portion of said blade, said exposed portion of said blade being coextensive with said second side of said first housing and said second housing wherein said exposed portion of said blade is configured to cut the member, said exposed portion of said blade being positioned at an angle corresponding to said engaging surface corresponding to each of said second pulley and said fourth pulley,
- a rest being coupled to and extending downwardly from said second housing, said rest being positioned on said third surface of said second housing, said rest being positioned at an intersection of said third surface of said second housing and said second surface of said second housing wherein said rest is configured to abut the member thereby facilitating said rest to retain the member in said cutting space, said rest having a first edge, rest being positioned such that said first edge is positioned at an angle corresponding to said exposed portion of said blade,
- a lever being movably coupled to said first wall of said first housing wherein said lever is configured to be manipulated, said lever engaging said first pulley such that said lever urges said first pulley along said axis, said lever selectively tightening and loosening said blade,
- a motor being coupled to said first wall of said second housing, said motor being aligned with said third pulley,
- a shaft being coupled between said motor and said third pulley such that said motor rotates said third pulley when said motor is turned on, said third pulley urging said blade to move when said motor is turned on,
- a trigger being coupled to said first handle wherein said trigger is configured to be manipulated, said trigger being electrically coupled to said motor such that said trigger turns said motor on when said trigger is manipulated, and
- a power cord being coupled to and extending outwardly from said first handle, said power cord being electrically coupled to said trigger, said power cord having a distal end with respect to said first handle, said distal end having a plug being electrically coupled thereto, said plug being configured to be electrically coupled to a power source.

* * * * *